US012627095B2

(12) United States Patent
Chin

(10) Patent No.: US 12,627,095 B2
(45) Date of Patent: May 12, 2026

(54) ELECTRICAL CONNECTOR ASSEMBLY, SOCKET ELECTRICAL CONNECTOR CABLE ASSEMBLY, AND PLUG ELECTRICAL CONNECTOR CABLE ASSEMBLY

(71) Applicant: ENERGY FULL ELECTRONICS CO., LTD., New Taipei City (TW)

(72) Inventor: Hsu-Shen Chin, New Taipei City (TW)

(73) Assignee: ENERGY FULL ELECTRONICS CO., LTD., New Taipei City (TW)

(*) Notice: Subject to any disclaimer, the term of this patent is extended or adjusted under 35 U.S.C. 154(b) by 518 days.

(21) Appl. No.: 18/189,407

(22) Filed: Mar. 24, 2023

(65) Prior Publication Data

US 2023/0307867 A1 Sep. 28, 2023

Related U.S. Application Data

(60) Provisional application No. 63/269,972, filed on Mar. 25, 2022.

(51) Int. Cl.

| | |
|---|---|
| ***H01R 24/20*** | (2011.01) |
| ***H01R 13/52*** | (2006.01) |
| *H01R 13/506* | (2006.01) |
| *H01R 24/28* | (2011.01) |
| *H01R 101/00* | (2006.01) |

(52) U.S. Cl.

CPC ....... *H01R 13/5219* (2013.01); *H01R 13/506* (2013.01); *H01R 24/20* (2013.01); *H01R 24/28* (2013.01); *H01R 2101/00* (2013.01)

(58) Field of Classification Search

None

See application file for complete search history.

(56) References Cited

U.S. PATENT DOCUMENTS

| | | | | |
|---|---|---|---|---|
| 2,677,115 A * | 4/1954 | Stevens | H01R 13/642 | 439/654 |
| 4,857,008 A * | 8/1989 | Kee | H01R 13/504 | 439/352 |
| 4,895,529 A * | 1/1990 | Thakrar | B29C 45/1676 | 439/588 |

(Continued)

FOREIGN PATENT DOCUMENTS

CN 107275869 A 10/2017

*Primary Examiner* — Tho D Ta

(74) *Attorney, Agent, or Firm* — Nathan & Associates; Menachem Nathan

(57) ABSTRACT

An electrical connector assembly includes a socket electrical connector cable assembly and a plug electrical connector cable assembly. The socket electrical connector cable assembly includes a socket connector, a socket front housing, a socket rear housing, a socket outer molding, and a socket cable. The socket rear housing covers the front side of the socket connector. The socket outer molding is positioned on the outer side of the socket connector. The socket cable is connected to the socket terminal. The plug electrical connector cable assembly includes a plug connector, a plug outer molding, and a plug cable. The plug outer molding is positioned on the rear side of the plug connector and has a plug outer molding waterproof portion. A socket terminal of the socket electrical connector cable assembly is connected to a plug terminal of the plug electrical connector cable assembly.

13 Claims, 6 Drawing Sheets

(56) References Cited

U.S. PATENT DOCUMENTS

| | | | | | |
|---|---|---|---|---|---|
| 4,895,530 | A * | 1/1990 | Gugelmeyer | H01R 13/623 | 439/387 |
| 5,666,829 | A * | 9/1997 | Aikens | H01R 13/6397 | 403/321 |
| 6,022,237 | A * | 2/2000 | Esh | H01R 13/5219 | 439/348 |
| 6,641,421 | B1 * | 11/2003 | Leavitt | H01R 13/53 | 439/271 |
| 7,195,505 | B1 * | 3/2007 | Becker | H01R 13/5219 | 439/282 |
| 7,285,003 | B2 * | 10/2007 | Cairns | H01R 13/521 | 439/353 |
| 9,465,173 | B2 * | 10/2016 | Becker | H01R 13/5219 | |
| 2013/0203277 | A1 * | 8/2013 | Gaubert | H01R 13/5219 | 439/271 |
| 2021/0344137 | A1 * | 11/2021 | Cairns | H01R 13/629 | |

* cited by examiner

ELECTRICAL CONNECTOR ASSEMBLY, SOCKET ELECTRICAL CONNECTOR CABLE ASSEMBLY, AND PLUG ELECTRICAL CONNECTOR CABLE ASSEMBLY

CROSS REFERENCE TO RELATED APPLICATION

This application claims the priority of U.S. provisional Application No. 63/269,972, filed on Mar. 25, 2022, the disclosure of which is incorporated herein by reference in its entirety.

FIELD OF THE DISCLOSURE

The present disclosure relates to an electrical connector assembly, and more particularly, to a socket electrical connector cable assembly and a plug electrical connector cable assemble having a waterproof structure between their connection interfaces.

BACKGROUND

As the market demand for cables for outdoor installations grows, the specifications of the supporting connectors become more stringent, and more attention is paid to the connector assemblies with different interfaces. The structure of the contact interface determines the electrical and mechanical properties of the connector, such as resistance, mating force and durability.

However, the electrical connector assembly generally used in electronic products does not have a waterproof design between the socket connector and the plug connector. When electrical connector assembly is used in outdoor or other environments that may be exposed to water, a short circuit may be formed due to the infiltration of water and thus electrical connector assembly is damaged or even a fire may occur to harm the user. Therefore, it is important to solve the above issue of the conventional structure.

SUMMARY

One objective of an embodiment of the present disclosure is to provide an electrical connector assembly to solve the above-mentioned issue.

According to an embodiment of the present disclosure, an electrical connector assembly is disclosed. The electrical connector assembly comprises a socket electrical connector cable assembly and a plug electrical connector cable assembly. The socket electrical connector cable assembly includes a socket connector, a socket front housing, a socket rear housing, a socket outer molding, and a socket cable. The socket connector has a socket terminal. The socket front housing has a compressing portion and a snap-in portion. The compressing portion is adjacent to the snap-in portion. The socket rear housing is assembled on the rear side of the socket front housing and covers the front side of the socket connector. The socket outer molding is positioned on the outer side of the socket connector. The socket cable is electrically connected to the socket terminal. The plug electrical connector cable assembly includes a plug connector, a plug outer molding, and a plug cable. The plug connector has a plug terminal. The plug outer molding is positioned on the rear side of the plug connector and has a plug outer molding waterproof portion. The plug cable is connected to the plug terminal. When the socket electrical connector cable assembly is docked with the plug electrical connector cable assembly, the socket terminal of the socket electrical connector cable assembly is connected to the plug terminal of the plug electrical connector cable assembly.

According to another embodiment of the present disclosure, an electrical connector assembly is disclosed. The electrical connector assembly comprises a socket electrical connector cable assembly and a plug electrical connector cable assembly. The socket electrical connector cable assembly includes a socket connector, a socket front housing, a socket inner molding, a socket outer molding, and a socket cable. The socket connector has a socket terminal. The socket front housing has a compressing portion and a snap-in portion. The compressing portion is adjacent to the snap-in portion. The socket inner molding covers the socket connector and assembled at the rear side of the socket front housing. The socket outer molding is positioned on the outer side of the socket connector and covering the socket inner molding. The socket cable is electrically connected to the socket terminal. The plug electrical connector cable assembly includes a plug connector, a plug outer molding, and a plug cable. The plug connector has a plug terminal. The plug outer molding is positioned on the rear side of the plug connector and has a plug outer molding waterproof portion. The plug cable is connected to the plug terminal. When the socket electrical connector cable assembly is docked with the plug electrical connector cable assembly, the socket terminal of the socket electrical connector cable assembly is connected to the plug terminal of the plug electrical connector cable assembly.

According to another embodiment of the present disclosure, an electrical connector assembly is disclosed. The electrical connector assembly comprises a socket electrical connector cable assembly and a plug electrical connector cable assembly. The socket electrical connector cable assembly includes a socket connector, a socket front housing, a socket outer molding, and a socket cable. The socket connector has a socket terminal. The socket front housing is assembled to the front side of the socket connector and has a compressing portion and a snap-in portion. The compressing portion is adjacent to the snap-in portion. The socket outer molding is positioned on the outer side of the socket connector. The socket cable is electrically connected to the socket terminal. The plug electrical connector cable assembly includes a plug connector, a plug outer molding, and a plug cable. The plug connector has a plug terminal. The plug outer molding is positioned on the rear side of the plug connector and has a plug outer molding waterproof portion. The plug cable is connected to the plug terminal. When the socket electrical connector cable assembly is docked with the plug electrical connector cable assembly, the socket terminal of the socket electrical connector cable assembly is connected to the plug terminal of the plug electrical connector cable assembly.

According to an embodiment of the present disclosure, a socket electrical connector cable assembly is provided. The socket electrical connector cable assembly includes a socket connector, a socket front housing, a socket rear housing, a socket outer molding, and a socket cable. The socket connector has a socket terminal. The socket front housing has a compressing portion and a snap-in portion. The compressing portion is adjacent to the snap-in portion. The socket rear housing is assembled on the rear side of the socket front housing and covers the front side of the socket connector. The socket outer molding is positioned on the outer side of the socket connector. The socket cable is electrically connected to the socket terminal.

According to another embodiment of the present disclosure, a socket electrical connector cable assembly is provided. The socket electrical connector cable assembly includes a socket connector, a socket front housing, a socket inner molding, a socket outer molding, and a socket cable. The socket connector has a socket terminal. The socket front housing has a compressing portion and a snap-in portion. The compressing portion is adjacent to the snap-in portion. The socket inner molding covers the socket connector and assembled at the rear side of the socket front housing. The socket outer molding is positioned on the outer side of the socket connector and covering the socket inner molding. The socket cable is electrically connected to the socket terminal.

According to another embodiment of the present disclosure, a socket electrical connector cable assembly is provided. The socket electrical connector cable assembly includes a socket connector, a socket front housing, a socket outer molding, and a socket cable. The socket connector has a socket terminal. The socket front housing is assembled to the front side of the socket connector and has a compressing portion and a snap-in portion. The compressing portion is adjacent to the snap-in portion. The socket outer molding is positioned on the outer side of the socket connector. The socket cable is electrically connected to the socket terminal.

According to another embodiment of the present disclosure, a plug electrical connector cable assembly is provided. The plug electrical connector cable assembly includes a plug connector, a plug outer molding, and a plug cable. The plug connector has a plug terminal. The plug outer molding is positioned on the rear side of the plug connector and has a plug outer molding waterproof portion. The plug cable is connected to the plug terminal.

In contrast to the conventional art, the electrical connector assembly has a gasket. In this way, when the socket electrical connector and the plug electrical connector are docked, the gasket could improve the sealing effect between the contact interfaces so that water or other liquid will not penetrate into the contact interfaces to cause a short circuit. Thus, the safety of use is improved.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF PREFERRED EMBODIMENTS

In order to facilitate understanding the technical features, content and advantages of the invention and the efficacy it can achieve, the present disclosure is hereby combined with the accompanying drawings, and the expression of the embodiment is described in detail as follows, and the scheme used therein, the main purpose of which is only for illustrative and auxiliary explanation purposes, may not be the true proportion and precise configuration of the embodiment of the present disclosure, so the proportion and configuration relationship of the attached drawing should not be interpreted, limiting the scope of rights of the invention in the actual implementation.

Spatially relative terms, such as “beneath”, “below”, “lower”, “above”, “upper” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures.

The following will refer to the relevant drawings, illustrating various embodiments of the replaceable socket device according to the present disclosure, for ease of understanding, the same components in the following embodiments are illustrated by the same symbols.

Figure 1:
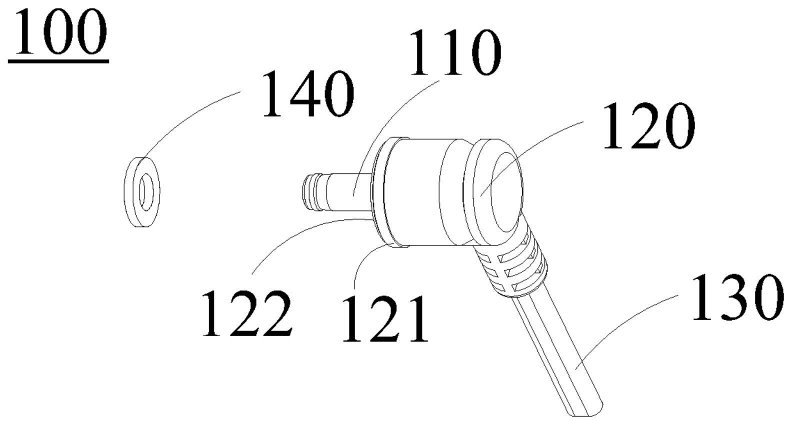
FIG. 1 is a three-dimensional view of a plug electrical connector cable assembly according to an embodiment of the present disclosure.
Figure 2:
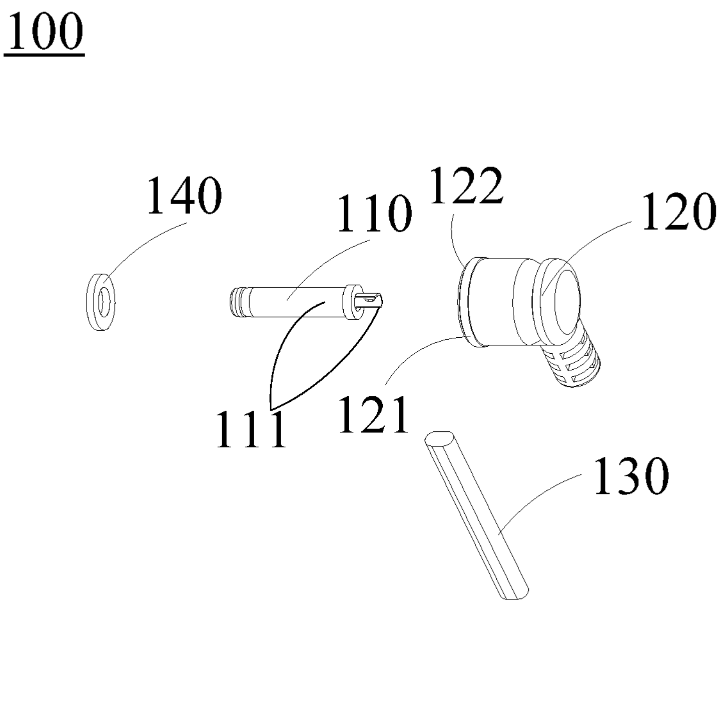
FIG. 2 is an exploded diagram of a plug electrical connector cable assembly according to an embodiment of the present disclosure.

Please refer to FIG. 1 and FIG. 2. FIG. 1 is a three-dimensional view of a plug electrical connector cable assembly according to an embodiment of the present disclosure. FIG. 2 is an exploded diagram of a plug electrical connector cable assembly according to an embodiment of the present disclosure. The plug electrical connector cable assembly 100 comprises a plug connector 110, a plug outer molding 120, a plug cable 130 and a plug gasket 140. The plug connector 110 has a plug terminal 111. The plug outer molding 120 is positioned on the rear side of the plug connector 110 and has a plug outer molding waterproof portion 121. The plug cable 130 and the plug terminal 111 are electrically connected. The plug gasket 140 is positioned on the plug compressing surface 122 at a front edge of the plug outer molding 120.

The specification of the plug connector 110, the actual configuration of the plug terminal 111 in the plug connector 110, the insulation material of the plug outer molding 120, the material and the specification of the plug cable 130, and the way the plug connector 110 is assembled in the plug outer molding 120, or the connection method in the entire plug electrical connector cable assembly 200 can be adjusted according to the actual use as long as the interface function is not affected. These changes all fall within the scope of the present disclosure.

Specifically, since the plug connector 110 is covered by the plug outer molding 120, the structure of the plug outer molding 120 determines the docking method of the plug electrical connector cable assembly 100 with other sockets or electronic products. As shown in FIGS. 1 and 2, the protruding plug connector 110 is cylindrical, and the structure of the plug outer molding 120 is also rounded. This structural design will not have a specific direction when it's docking. Thus, the user can easily assemble it. However, the structure is not limited to this specific design. In some embodiments, the user may choose different shapes of plug outer molding 120 according to the actual needs.

Figure 3:
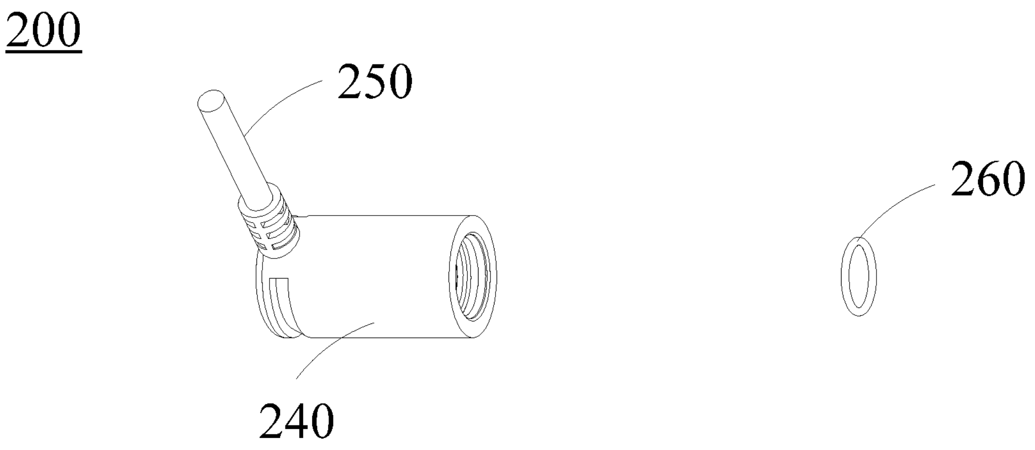
FIG. 3 is a three-dimensional view of a socket electrical connector cable assembly according to a first embodiment of the present disclosure.
Figure 4:
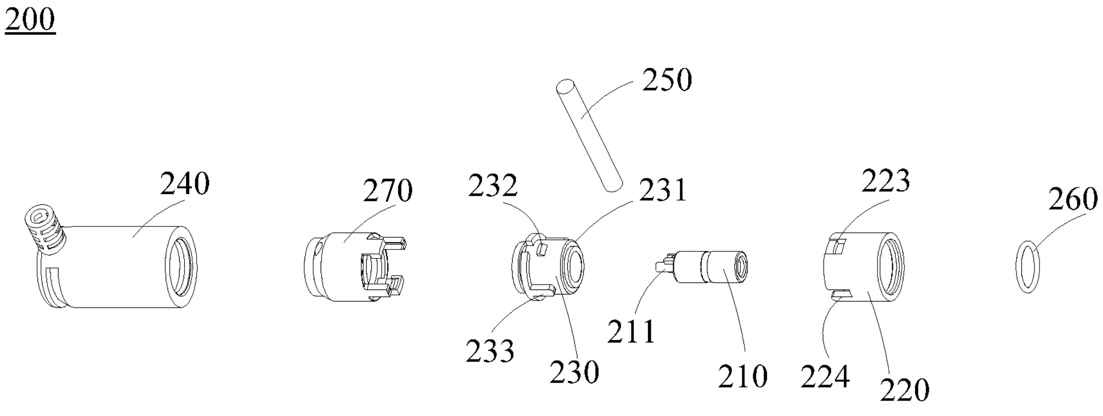
FIG. 4 is an exploded diagram of a socket electrical connector cable assembly according to the first embodiment of the present disclosure.

Please refer to FIG. 3 and FIG. 4. FIG. 3 is a three-dimensional view of a socket electrical connector cable assembly according to a first embodiment of the present disclosure. FIG. 4 is an exploded diagram of a socket electrical connector cable assembly according to the first embodiment of the present disclosure. As show in FIG. 4, the socket electrical connector cable assembly 200 comprises a socket connector 210, a socket front housing 220, a socket rear housing 230, a socket outer molding 240, a socket cable 250 and a socket gasket 260. The socket connector 210 has a socket terminal 211. The socket front housing 220 has a compressing portion 221 and a snap-in portion 222. The compressing portion 221 is adjacent to the snap-in portion 222. The socket rear housing 230 is assembled on the rear side of the socket front housing 220 and covers the front side of the socket connector 210. The socket outer molding 240 is positioned on the outside of the socket connector 210 and is positioned outside the socket front housing 220. The socket cable 250 and the socket terminal 211 are electrically connected. The socket gasket 260 is positioned on the socket compressing surface 231 at a front edge of the socket rear housing 230.

The specification of the socket connector 210, the actual configuration of the socket terminal 211 in the socket connector 210, the insulation material of the socket outer molding 240, the material and the specification of the socket cable 250, and the way the socket connector 210 is assembled in the socket outer molding 240, or the connection method in the entire plug electrical connector cable assembly 200 can be adjusted according to the actual use as long as the interface function is not affected. These changes all fall within the scope of the present disclosure.

From FIG. 3, it can be seen that in the assembled socket electrical connector cable assembly 200, the socket outer molding 240 covers the socket connector 210, the socket front housing 220 and socket rear housing 230 in it. Accordingly, the socket outer molding 240 could provide more protection to the internal socket connector 210, extend the service life of the socket electrical connector cable assembly 200, and allow users to easily replace parts in maintenance. Here, the material between the socket outer molding 240 and the socket front housing 220 and/or the socket rear housing 230 may be adjusted to maximize the benefits.

As shown in FIG. 4, the socket connector 210 has a socket terminal 211. The socket electrical connector cable assembly 200 has a socket inner molding 270, which is also covered by the socket outer molding 240. The socket front housing 220 has a first fixing portion 223 and a first guiding portion 224, and the socket rear housing 230 has a second fixing portion 232 and a second guiding portion 233. When the socket front housing 220 and the socket rear housing 230 are assembled, the first fixing portion 223 corresponds to the second fixing portion 232 and they are assembled in the direction of the first guiding portion 224 and the second guiding portion 233. However, the assembling method is not limited hereto. In some embodiments, the socket front housing 220 has a first fixing portion 223 and the socket rear housing 230 has a second fixing portion 232 without any guiding portion. Or, the socket front housing 220 only has the first guiding portion 224 and the socket rear housing 230 only has a second guiding portion 233 for the corresponding assembly. Here, the snap-in structure and fixing method between the first fixing portion 223 and the second fixing portion 232, and the guiding length and structure of the first guiding portion 224 and the second guiding portion 233 are also not limited hereto.

Figure 5:
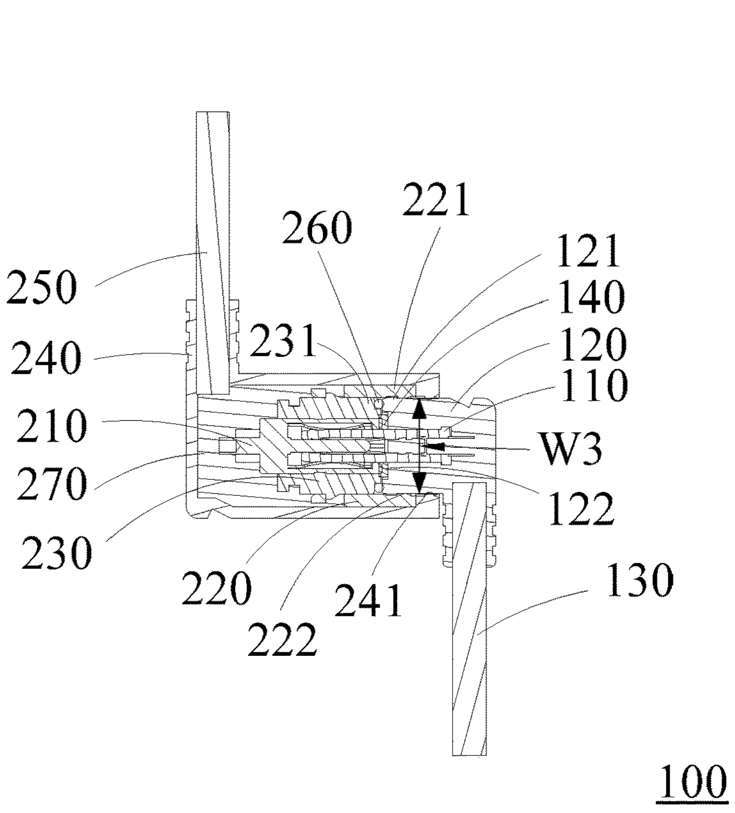
FIG. 5 is a cross-section view of the electrical connector assembly in a docking state according to the first embodiment of the present disclosure.
Figure 6:
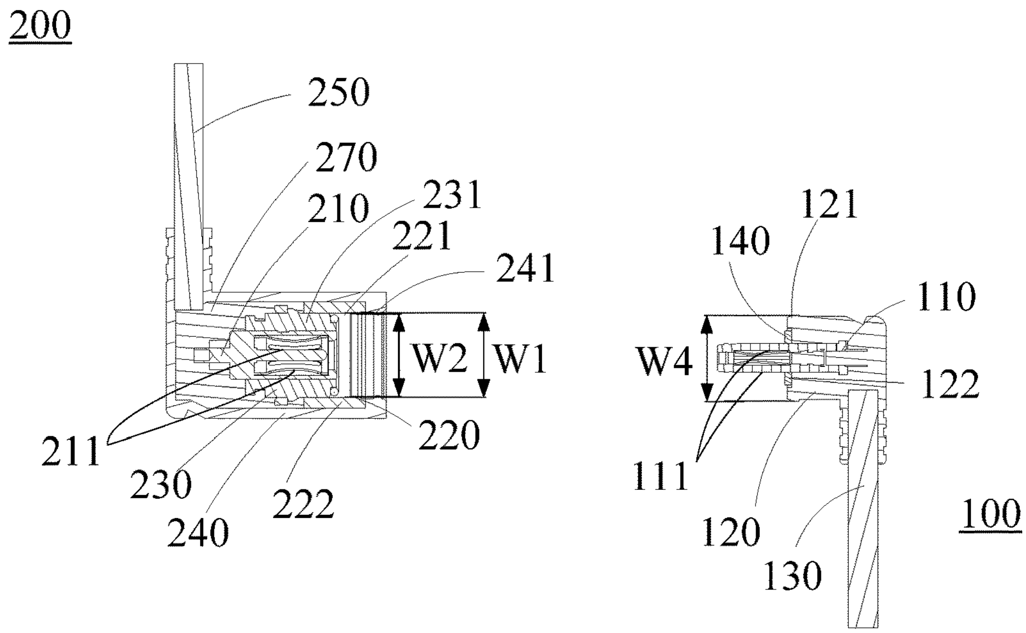
FIG. 6 is a cross-section view of the electrical connector assembly in a non-docking state according to the first embodiment of the present disclosure.

Please refer to FIGS. 5-6. FIG. 5 is a cross-section view of the electrical connector assembly in a docking state according to the first embodiment of the present disclosure. FIG. 6 is a cross-section view of the electrical connector assembly in a non-docking state according to the first embodiment of the present disclosure. As shown in FIGS. 5 and 6, the electrical connector assembly includes a plug electrical connector cable assembly 100 and a socket electrical connector cable assembly 200. When the socket electrical connector cable assembly 200 is docked with the plug electrical connector cable assembly 100, the socket terminal 211 of the socket electrical connector cable assembly 200 is connected to the plug terminal 111 of the plug electrical connector cable assembly 100.

As can be seen from FIGS. 5 and 6, the socket front housing 220 has a compressing portion 221 and a snap-in portion 222. The compressing portion 221 is adjacent to the snap-in portion 222. The width W1 of the compressing portion 221 is greater than the width W2 of the snap-in portion 222. The socket outer molding 240 has a socket outer molding waterproof portion 241, and the width W3 of the socket outer molding waterproof portion 241 is smaller than the width W4 of the plug outer molding 120. Specifically, the plug gasket 140 is positioned on the plug compressing surface 122 at a front edge of the plug outer molding 120, and the socket gasket 260 is positioned on the compressing surface 231 at a front edge of the socket rear housing 230. Thus, when the socket electrical connector cable assembly 200 is docked with the plug electrical connector cable assembly 100, the socket gasket 260 and the plug gasket 140 are used as a spacer between the contact interfaces for protecting the socket electrical connector cable assembly 200 and the plug electrical connector cable assembly 100 from damages caused by multiple plugging operations. The socket gasket 260 and the plug gasket 140 could disperse the pressure of the contact interfaces in the electrical connector assembly, and reduce the disengagement caused by external forces.

Furthermore, as previously mentioned, the plug compressing surface 122 is provided with a plug gasket 140 and the socket compressing surface 231 is provided with a socket gasket 260. In this way, when the electrical connector is assembled, because the width W3 of the socket outer molding waterproof portion 241 is smaller than the width W4 of the plug outer molding 120 (the maximum width of the plug electrical connector cable assembly 100 is greater than the width provided by the socket electrical connector cable assembly 200), the user needs to apply some force to make the plug electrical connector cable assembly 100 pass through the socket outer molding 230 of the socket electrical connector cable assembly 200. After the plug gasket 140 is docked with the socket gasket 260, in addition to the corresponding compressing surfaces, a buffer between the electrical connector assemblies is provided. This structure allows the electrical connector assembly to form a completely sealed state, which can effectively prevent water or other liquids from entering the electrical connector assembly.

Figure 7:
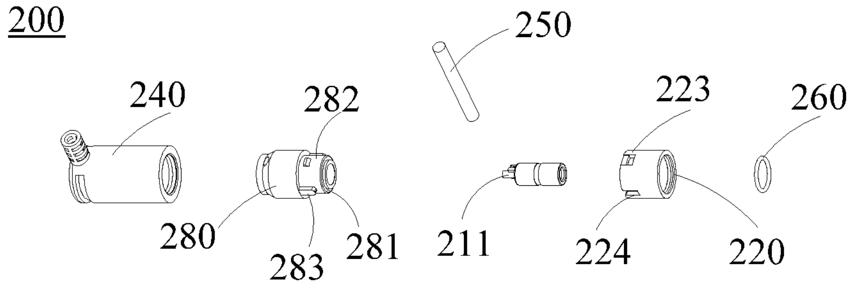
FIG. 7 is an exploded diagram of a socket electrical connector cable assembly according to a second embodiment of the present disclosure.

Please refer to FIG. 7. FIG. 7 is an exploded diagram of a socket electrical connector cable assembly according to a second embodiment of the present disclosure. The socket electrical connector cable assembly 200 comprises a socket connector 210, a socket front housing 220, a socket inner molding 280, a socket outer molding 240, a socket cable 250 and a socket gasket 260. The socket connector 210 has a socket terminal 211. The socket inner molding 280 covers the socket connector 210 and is assembled on the rear side of the socket front housing 220. The socket outer molding 240 is provided on the outside of the socket connector 210, covers the socket inner molding 280 and has a socket outer molding waterproof portion 241. The socket outer molding waterproof portion 241 is positioned on the outside of the socket front housing 220. The socket cable 250 and the socket terminal 211 are electrically connected. The socket gasket 260 is positioned on the socket compressing surface 281 at the fount edge of the socket inner molding 280.

In this embodiment, in the assembled socket electrical connector cable assembly 200, the socket outer molding 240 covers the socket connector 210, the socket front housing 220 and the socket inner molding 280. The socket outer molding 240 could provide more protection to the internal socket connector 210, extend the service life of the socket electrical connector cable assembly 200, and allow users to easily replace parts in maintenance. Here, the material between the socket outer molding 240 and the socket front housing 220 and/or the socket inner molding 280 may be adjusted to maximize the benefits.

As shown in FIG. 7, the socket connector 210 has a socket terminal 211. The socket front housing 220 has a first fixing portion 223 and a first guiding portion 224, and the socket inner molding 280 has a third fixing portion 282 and a third guiding portion 283. When the socket front housing 220 and socket inner molding 280 are assembled, the first fixing portion 223 corresponds to the third fixing portion 282, and they are assembled in the direction of the first guiding portion 224 and the third guiding portion 283. However, the assembling method is not limited hereto. In some embodiments, the socket front housing 220 may only have a first fixing portion 223, and the socket inner molding 280 may only have a third fixing portion 282. Or, socket front housing 220 may only have the first guiding portion 224, and the socket inner molding 280 may only have a third guiding portion 283. Here, the snap-in structure and fixing method between the first fixing portion 223 and the third fixing portion 282, and the guiding length and structure between the first guiding portion 224 and the third guiding portion 283 are also not limited hereto.

Figure 8:
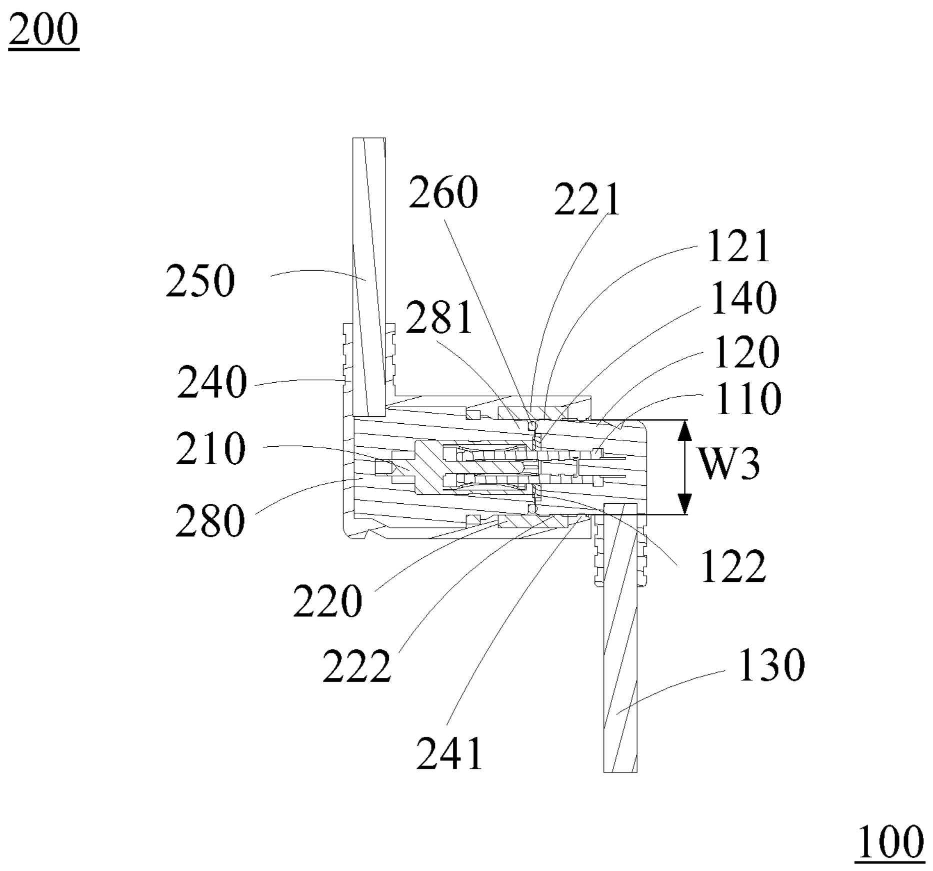
FIG. 8 is a cross-section view of the electrical connector assembly in a docking state according to the second embodiment of the present disclosure.
Figure 9:
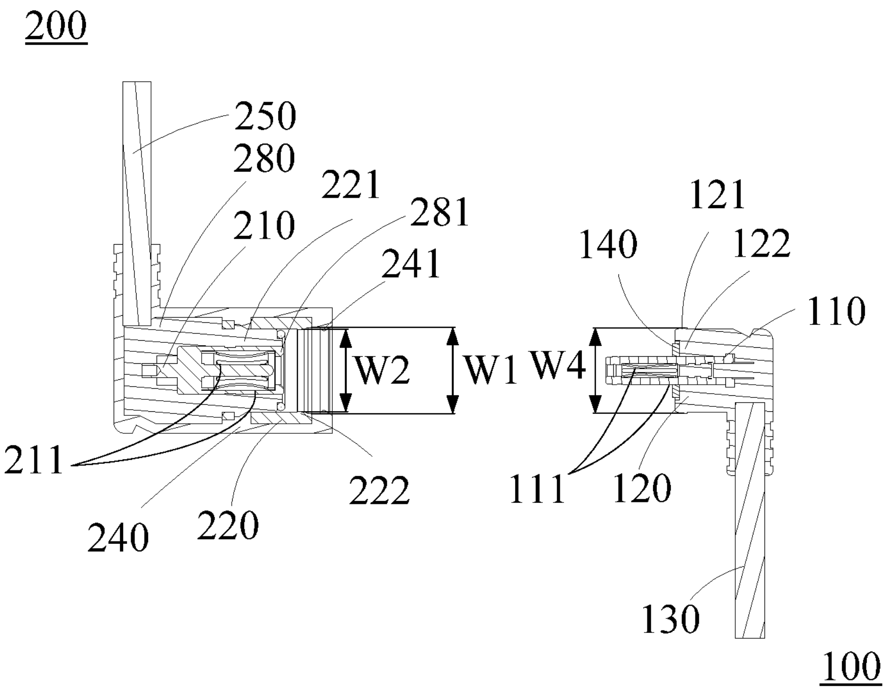
FIG. 9 is a cross-section view of the electrical connector assembly in a non-docking state according to the second embodiment of the present disclosure.

Please refer to FIGS. 8 and 9. FIG. 8 is a cross-section view of the electrical connector assembly in a docking state according to the second embodiment of the present disclosure. FIG. 9 is a cross-section view of the electrical connector assembly in a non-docking state according to the second embodiment of the present disclosure. The electrical connector assembly includes a plug electrical connector cable assembly 100 and a socket electrical connector cable assembly 200. When the socket electrical connector cable assembly 200 is docked with the plug electrical connector cable assembly 100, the socket terminal 211 of the socket electrical connector cable assembly 200 is connected to the plug terminal 111 of the plug electrical connector cable assembly 100.

The socket front housing 220 has a compressing portion 221 and a snap-in portion 222. The compressing portion 221 is adjacent to the snap-in portion 222. The width W1 of the compressing portion 221 is greater than the width W2 of the snap-in portion 222. The socket outer molding 240 has a socket outer molding waterproof portion 241. The width W3 of the socket outer molding waterproof portion 241 is smaller than the width W4 of the plug outer molding 120. Specifically, the plug gasket 140 is positioned on the plug compressing surface 122 at a front edge of the plug outer molding 120, and the socket gasket 260 is positioned on the socket compressing surface 281 at a front edge of the socket inner molding 280. Thus, when the socket electrical connector cable assembly 200 and the plug electrical connector cable assembly 100 docking, between the contact interface, the socket gasket 260 and the plug gasket 140 As a spacer, it is used to protect the socket electrical connector cable assembly 200 and the plug electrical connector cable assembly 100 from multiple plugging caused by excessive damage, disperse the pressure of the contact interface in the electrical connector assembly, and reduce the disengagement caused by external forces.

By arranging the plug gasket 140 on the plug compressing surface 122 and arranging the socket gasket 260 on the socket compressing surface 281, when the electrical connector assembly is docked, because the width W3 of the socket outer molding waterproof portion 241 is smaller than the width W4 of the plug outer molding 120 (that is, the part of the maximum width of the plug electrical connector cable assembly 100 is larger than the width provided by the socket electrical connector cable assembly 200), the user needs to apply some force to make the plug electrical connector cable assembly 100 pass through the socket outer molding 230 of the socket electrical connector cable assembly 200. After docking, the plug gasket 140 and the socket gasket 260 provide a buffer in the electrical connector assembly in addition to the corresponding compressing surfaces. This structure makes the electrical connector assembly of this embodiment form a completely sealed state, which can effectively prevent water or other liquid from entering the assembly.

Figure 10:
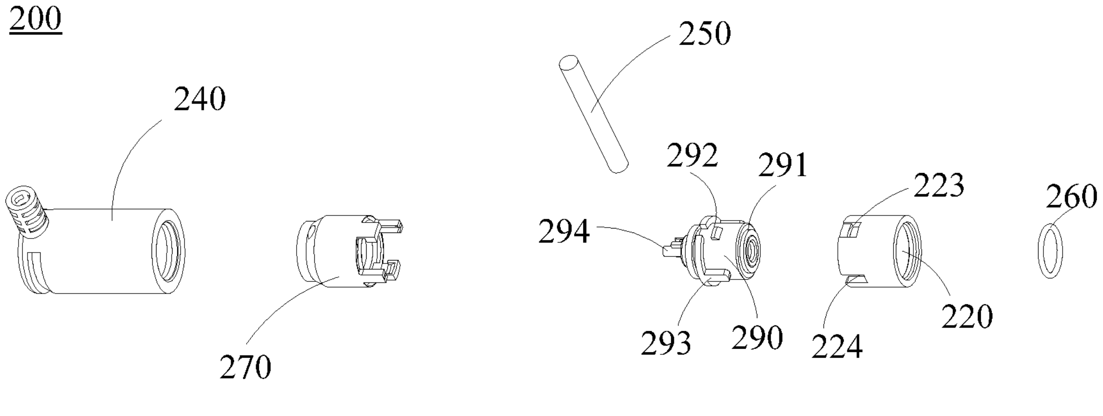
FIG. 10 is an exploded diagram of a socket electrical connector cable assembly according to a third embodiment of the present disclosure.

Please refer to FIG. 10. FIG. 10 is an exploded diagram of a socket electrical connector cable assembly according to a third embodiment of the present disclosure. The socket electrical connector cable assembly 200 comprises a socket connector 290, a socket front housing 220, a socket outer molding 240, a socket cable 250 and a socket gasket 260. The socket connector 290 has a socket terminal 294. The socket front housing 220 is assembled on the front side of the socket connector 290. The socket outer molding 240 is positioned on the outside of the socket connector 290 and has a socket outer molding waterproof portion 241. The socket outer molding waterproof portion 241 is positioned outside the socket front housing 220. The socket cable 250 and the socket terminal 294 are electrically connected. The socket gasket 260 is positioned on the plug compressing surface 291 of a front edge of the socket connector 290.

From FIG. 10, it can be seen that the socket electrical connector cable assembly 200 further comprises a socket inner molding 270, which is also covered by the socket outer molding 240. After assembling, in the socket electrical connector cable assembly 200, the socket outer molding 240 will cover the socket connector 290, the socket inner molding 270 and the socket front housing 220. The socket outer molding 240 could provide more protection to the internal socket connector 210, extend the service life of the socket electrical connector cable assembly 200, and allow users to easily replace parts in maintenance. The material between the socket outer molding 240 and the socket front housing 220 and the socket rear housing 230 may be adjusted according to actual needs to maximize the benefits.

The housing of the socket connector 290 is manufactured with a metal or an insulating material, but is not limited to hereto. In this embodiment, the arrangement of disposing the socket connector 290 in the socket outer molding 240 or the connection method between the socket front housing 220 and the socket inner molding 270 can be adjusted according to the actual needs, and are not limited hereto.

As shown in FIG. 10, the socket connector 290 has a socket terminal 294. The socket front housing 220 has a first fixing portion 223 and a first guiding portion 224. The socket connector 290 has a fourth fixing portion 292 and a fourth guiding portion 293. When the socket front housing 220 and the socket connector 290 are assembled, the first fixing portion 223 corresponds to the fourth fixed portion 292 and they are assembled in the direction of the first guiding portion 224 and the fourth guiding portion 293. However, this assembling method is not limited hereto. In some embodiments, the socket front housing 220 may only have the first fixing portion 223 and the socket connector 290 may only have the fourth fixing portion 292. Or, the socket front housing 220 may only have the first guiding portion 224 and the socket connector 290 may only have the fourth guiding portion 293. Here, the snap-in structure and fixing method between the first fixed portion 223 and the fourth fixed portion 292, and the guiding length and structure between the first guiding portion 224 and the fourth guiding portion 293 are not limited hereto.

Figure 11:
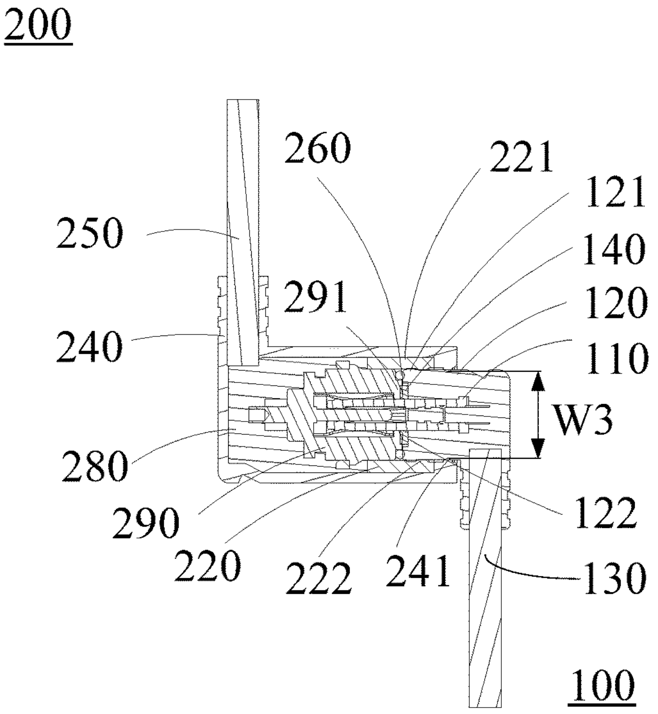
FIG. 11 is a cross-section view of the electrical connector assembly in a docking state according to the third embodiment of the present disclosure.
Figure 12:
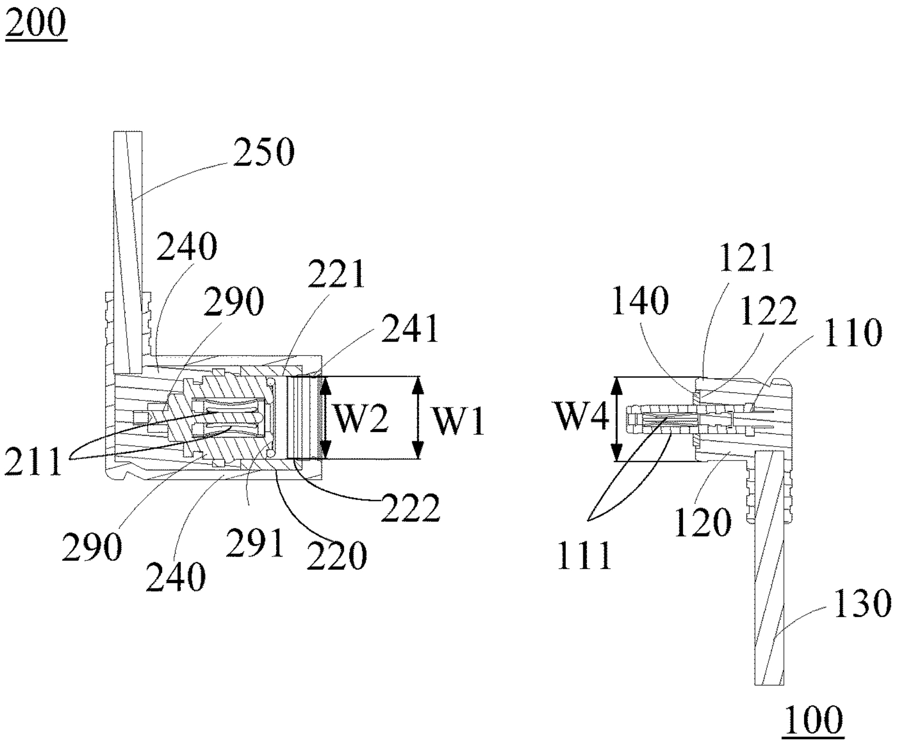
FIG. 12 is a cross-section view of the electrical connector assembly in a non-docking state according to the third embodiment of the present disclosure.

Please refer to FIG. 11 and FIG. 12. FIG. 11 is a cross-section view of the electrical connector assembly in a docking state according to the third embodiment of the present disclosure. FIG. 12 is a cross-section view of the electrical connector assembly in a non-docking state according to the third embodiment of the present disclosure. The electrical connector assembly comprises a plug electrical connector cable assembly 100 and a socket electrical connector cable assembly 200. When the socket electrical connector cable assembly 200 and the plug electrical connector cable assembly 100 are docked, the socket terminal 294 of the socket electrical connector cable assembly 200 is connected to the plug terminal 111 of the plug electrical connector cable assembly 100.

From FIGS. 11 and 12, it can be seen that the socket front housing 220 has a compressing portion 221 and a snap-in portion 222. The compressing portion 221 is adjacent to the snap-in portion 222. The width W1 of the compressing portion 221 is greater than the width W2 of the snap-in portion 222. The socket outer molding 240 has a socket outer molding waterproof portion 241. The width W3 of the socket outer molding waterproof portion 241 is smaller than the width W4 of the plug outer molding 120. Specifically, the plug gasket 140 is positioned on the plug compressing surface 122 at the a front edge of the plug outer molding 120, and the socket gasket 260 is positioned on socket compressing surface 291 at a front edge of the socket connector 290. Thus, when the socket electrical connector cable assembly 200 is docked with the plug electrical connector cable assembly 100, between the contact interfaces, the socket gasket 260 and the plug gasket 140 are used as a spacer to protect the socket electrical connector cable assembly 200 and the plug electrical connector cable assembly 100 from being damaged due to multiple plugging. Furthermore, the socket gasket 260 and the plug gasket 140 could disperse the pressure of the contact interfaces in the electrical connector assembly and reduce the disengagement caused by external forces.

In more detail, the plug gasket 140 is positioned on the plug compressing surface 122, and the socket pad 260 is positioned on the compressing surface 291. By this arrangement, when the electrical connector assembly is docked, because the width W3 of the socket outer molding waterproof portion 241 is smaller than the width W4 of the plug outer molding 120 (that is, the maximum width of the plug electrical connector cable assembly 100 is greater than the width provided by the socket electrical connector cable assembly 200), and the user needs to apply some force to make the plug electrical connector cable assembly 100 pass through the socket outer molding 230 of the socket electrical connector cable assembly 200. After docking, the plug gasket 140 and the socket gasket 260 provide a buffer in the electrical connector assembly in addition to their corresponding compressing surfaces. This structure makes the electrical connector assembly of this embodiment form a completely sealed state, which can effectively prevent the water or other liquids from entering the assembly.

In contrast to the conventional art, the electrical connector assembly of this present disclosure has a gasket. In this way, when the socket electrical connector cable assembly 200 is docked with and the plug electrical connector cable assembly 100, the gasket could improve the sealing effect between the contact interfaces so that water or other liquid will not penetrate into the contact interfaces to cause a short circuit. Thus, the safety of use is improved.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An electrical connector assembly, comprising:

a socket electrical connector cable assembly, comprising:
- a socket connector, having a socket terminal;
- a socket front housing, having a compressing portion and a snap-in portion, wherein the compressing portion is adjacent to the snap-in portion;
- a socket rear housing, assembled on the rear side of the socket front housing and covering the front side of the socket connector;
- a socket gasket, positioned on a socket compressing surface at a front edge of the socket rear housing;
- a socket outer molding, positioned on the outer side of the socket connector; and
- a socket cable, electrically connected to the socket terminal; and a plug electrical connector cable assembly, comprising:
- a plug connector, having a plug terminal;
- a plug outer molding, positioned on the rear side of the plug connector and having a plug outer molding waterproof portion;
- a plug gasket, positioned on a plug compressing surface at a front edge of the plug outer molding; and
- a plug cable, connected to the plug terminal;

wherein when the socket electrical connector cable assembly is docked with the plug electrical connector cable assembly, the socket terminal of the socket electrical connector cable assembly is connected to the plug terminal of the plug electrical connector cable assembly.

2. The electrical connector assembly of claim 1 wherein the socket electrical connector cable assembly further comprises:

a socket outer molding waterproof portion, positioned on the outer side of the socket front housing.

3. The electrical connector assembly of claim 1, wherein a width of the compressing portion is greater than a width of the snap-in portion.

4. The electrical connector assembly of claim 1, wherein a width of the waterproof portion is smaller than a width of the socket outer molding.

5. An electrical connector assembly, comprising:

a socket electrical connector cable assembly, comprising:

a socket connector, having a socket terminal;

a socket front housing, having a compressing portion and a snap-in portion, wherein the compressing portion is adjacent to the snap-in portion;

a socket inner molding, covering the socket connector and assembled at the rear side of the socket front housing;

a socket gasket, positioned on a socket compressing surface at a front edge of the socket inner molding;

a socket outer molding, positioned on the outer side of the socket connector and covering the socket inner molding; and a socket cable, electrically connected to the socket terminal; and a plug electrical connector cable assembly, comprising:

a plug connector, having a plug terminal;

a plug outer molding, positioned on the rear side of the plug connector and having a plug outer molding waterproof portion;

a plug gasket, positioned on a plug compressing surface at a front edge of the plug outer molding; and a plug cable, connected to the plug terminal;

wherein when the socket electrical connector cable assembly is docked with the plug electrical connector cable assembly, the socket terminal of the socket electrical connector cable assembly is connected to the plug terminal of the plug electrical connector cable assembly.

6. An electrical connector assembly, comprising:

a socket electrical connector cable assembly, comprising:

a socket connector, having a socket terminal;

a socket gasket, positioned on a socket compressing surface at a front edge of the socket connector;

a socket front housing, assembled to the front side of the socket connector and having a compressing portion and a snap-in portion, wherein the compressing portion is adjacent to the snap-in portion; and a socket outer molding, positioned on the outer side of the socket connector; and a socket cable, electrically connected to the socket terminal; and a plug electrical connector cable assembly, comprising:

a plug connector, having a plug terminal;

a plug outer molding, positioned on the rear side of the plug connector and having a plug outer molding waterproof portion;

a plug gasket, positioned on a plug compressing surface at a front edge of the plug outer molding; and a plug cable, connected to the plug terminal;

wherein when the socket electrical connector cable assembly is docked with the plug electrical connector cable assembly, the socket terminal of the socket electrical connector cable assembly is connected to the plug terminal of the plug electrical connector cable assembly.

7. The electrical connector assembly of claim 6, wherein a shell of the socket connector is manufactured with a metal or an insulating material.

8. A socket electrical connector cable assembly, comprising:

a socket connector, having a socket terminal;

a socket front housing, having a compressing portion and a snap-in portion, wherein the compressing portion is adjacent to the snap-in portion;

a socket rear housing, assembled on the rear side of the socket front housing and covering the front side of the socket connector;

a socket gasket, positioned on a socket compressing surface at a front edge of the socket rear housing;

a socket outer molding, positioned on the outer side of the socket connector; and a socket cable, electrically connected to the socket terminal.

9. The socket electrical connector cable assembly of claim 8, further comprising:

a socket outer molding waterproof portion, positioned on the outer side of the socket front housing.

10. The socket electrical connector cable assembly of claim 8, wherein a width of the compressing portion is greater than a width of the snap-in portion.

11. A socket electrical connector cable assembly, comprising:

a socket connector, having a socket terminal;

a socket front housing, having a compressing portion and a snap-in portion, wherein the compressing portion is adjacent to the snap-in portion;

a socket inner molding, covering the socket connector and assembled at the rear side of the socket front housing;

a socket gasket, positioned on a socket compressing surface at a front edge of the socket inner molding;

a socket outer molding, positioned on the outer side of the socket connector and covering the socket inner molding; and a socket cable, electrically connected to the socket terminal.

12. A socket electrical connector cable assembly, comprising:

a socket connector, having a socket terminal;

a socket gasket, positioned on a socket compressing surface at a front edge of the socket connector;

a socket front housing, assembled to the front side of the socket connector and having a compressing portion and a snap-in portion, wherein the compressing portion is adjacent to the snap-in portion;

a socket outer molding, positioned on the outer side of the socket connector; and a socket cable, electrically connected to the socket terminal.

13. A plug electrical connector cable assembly, comprising:

a plug connector, having a plug terminal;

a plug outer molding, positioned on the rear side of the plug connector and having a plug outer molding waterproof portion;

a plug gasket, positioned on a plug compressing surface at a front edge of the plug outer molding; and a plug cable, connected to the plug terminal.

* * * * *